Feb. 14, 1933.  C. E. REED  1,897,588
ROTARY DRILLING APPARATUS

Original Filed July 9, 1929

INVENTOR.
Clarence E. Reed

BY

Ira L. Nickerson
ATTORNEY.

Patented Feb. 14, 1933

1,897,588

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

ROTARY DRILLING APPARATUS

Application filed July 9, 1929, Serial No. 376,893. Renewed July 12, 1932.

This invention relates to apparatus for drilling deep wells and more particularly concerns the elements or cutters mounted in the bit head which have direct contact with the formation to be drilled.

Among the objects of the invention are to devise drilling apparatus for making a straight hole, to provide a control lead or guide for the cutting means, to form conical cutters with cutting zones having different lateral projections as to the face of the material to be penetrated, to provide large teeth on the cutters at the points of greatest wear, and in general to improve prior devices and apparatus in the interest of more effective performance with consequent economies in operating expense.

Figure 1:
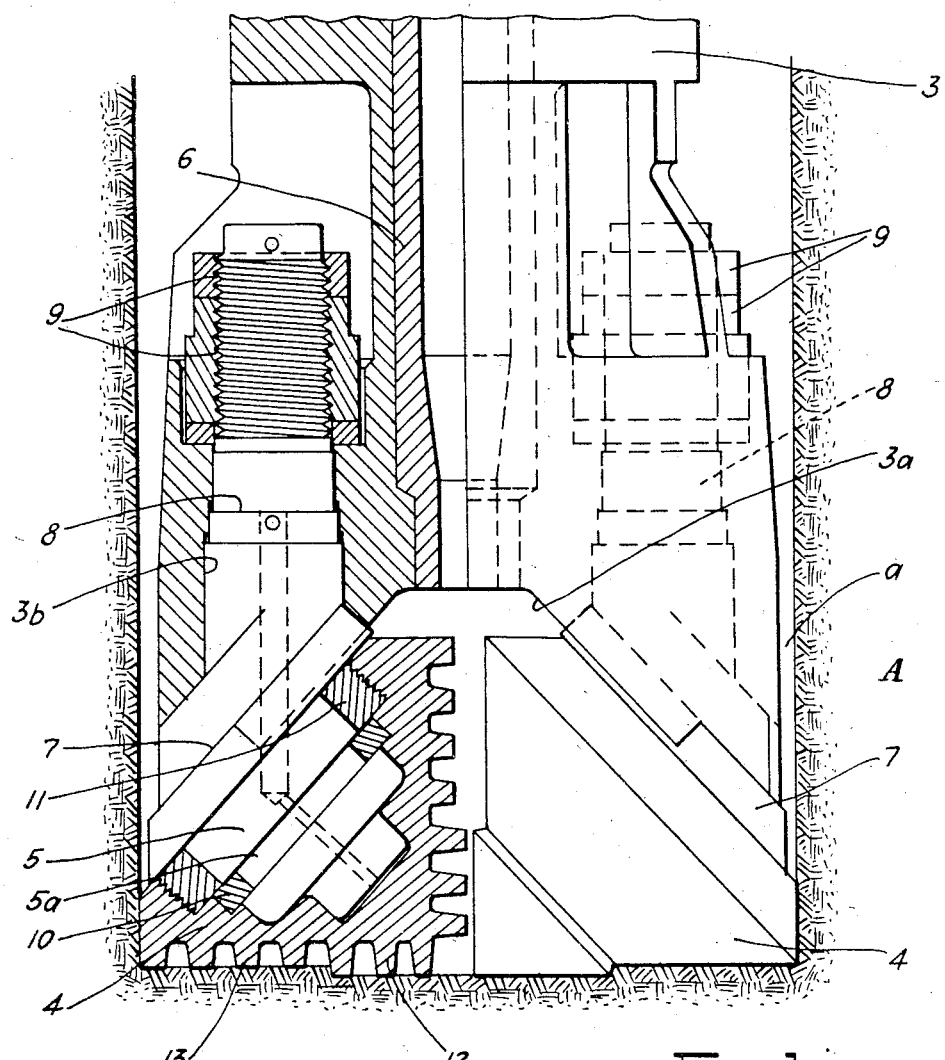
Figure 2:
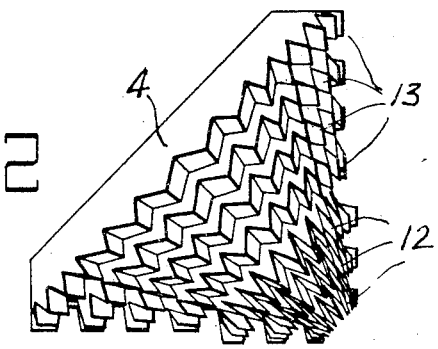

In order to illustrate the invention one concrete embodiment thereof is shown in the accompanying drawing in which:

Fig. 1 is a view of the lower portion of an earth boring drill in operation on the bottom of a drill hole, the left side of the head being in vertical section except as to the spindle mounting while the right side is in elevation, the cutter on that side being shown in outline only; and Fig. 2 is a side elevational view of one of the cutters shown in Fig. 1.

Fig. 1 illustrates the invention as in use for drilling a hole $a$ in formation A, the bit head 3 being of the rotary type carrying two conical or frusto-conical cutters 4 which are rotatably mounted on spindles 5 projecting from head 3 into an inverted V-shaped recess $3^a$ formed in the lower portion of the latter. Cutters 4 are arranged to cut substantially the full area of the hole and an axial water course 6 delivers flushing fluid between the roller cutters to assist in the drilling operation.

While head 3 may be of the known two-piece type with spindles 5 integral therewith, it is preferably of the one-piece type (such as disclosed in my Patents 1,636,666, 1,636,667 and 1,636,668 issued July 19, 1927), spindles 5 being formed as parts of separate elements which have base plates 7 fitting in seat recesses adjacent main recess $3a$ of the head and with shanks 8 extending from the base plates into sockets $3b$ in the head parallel with the axis of the same. Suitable securing means, such as nuts 9, applied to the threaded end of shank 8 may hold the spindle shank elements in place. Each roller cutter 4 may be held upon its spindle 5 in any suitable manner, the means shown conforming to my Patent No. 1,692,793 and comprising a segmental locking ring 10 floating in a locking recess $5a$ in the spindle and engaged by a retainer ring 11 having threaded engagement with, or being otherwise secured to, cutter 4.

The invention resides primarily in the formation and toothed arrangement of roller cutters 4 whereby they cut the formation on parallel levels and maintain a straight hole. To this end cutters 4 are formed with cutting zones best indicated in the outline of the cutter shown on the right side of Fig. 1. As indicated, the apex portion of the cone has a relatively greater lateral extent or projection than the remainder of the cutter or overhangs the same. When teeth 12, 13 are formed on the cutters by straight cuts from the apex but normal to the conical surface, i. e. parallel to both steps of the same, and by annular cuts, it results in teeth 12 of greater length on the extended apex portions than upon the remainder of the cutter. Accordingly, the teeth 12 on the apex portions of the two cutters penetrate the formation to a greater extent than teeth 13 and cut an annular central guide zone for the bit head which is always in advance of or at a lower parallel level than the remainder of the hole. This construction has the further advantage of providing long teeth on the cones at the point of greatest wear, namely, near the apex with the result that cutters of the disclosed type have improved penetrating qualities, a longer effective life and tend to drill a straight hole.

While the invention has been herein disclosed in what is considered to be its preferred form, it is to be understood that the invention is not limited to the specific details thereof, but covers all changes, modifications and adaptations within the scope of the appended claims.

I claim as my invention:

1. Earth boring apparatus having cone cutters mounted to cut simultaneously substantially the full area of the hole, said cutters providing two distinct zones of cutting teeth adjacent the base and adjacent the apex respectively, each zone comprising a plurality of spaced annular rows of teeth, the teeth in the apex zone being of greater length than the teeth in the base zone to increase the efficiency of the apparatus and to cut a central guide area to a lower horizontal level than that cut by said base zone of teeth.

2. Earth boring apparatus comprising a bit head having a recess at its lower end, a pair of cone cutters rotatably mounted on said head to pass over substantially the full diameter of the hole to be drilled and extending toward one another into said recess, the inner or apex portions of said cutters being symmetrically enlarged and having cutting teeth of greater length than the teeth on the base portions thereof, thereby to provide increased cutting efficiency in the zone of greatest wear and to effect cutting in the drill holes on two levels perpendicular to the axis of the apparatus.

3. A roller cutter of conical or frusto-conical form having teeth on its inclined sides formed by straight cuts normal to its surface and by annular or concentric cuts normal to the axis of the cutter, said cutter having a symmetrical enlargement at its apex end to provide an annular zone of teeth of superior length adjacent its apex.

4. A roller cutter of conical or frusto-conical form symmetrically enlarged at its apex end to divide its cutting area into two concentric zones, said zones being provided with teeth by reason of radial cuts normal to the surfaces of both zones and by annular cuts to the depth in each of said zones established by said radial cuts thereby to provide annular rows of teeth of the same length in each of said zones, the teeth in the apex zone being longer than the teeth in the base zone to increase the efficiency and life of the cutter and to provide for cutting to a uniform depth in each of two areas of different depth.

Signed by me at Wichita, in the county of Sedgwick and State of Kansas, this 1st day of July, 1929.

CLARENCE E. REED.